Aug. 7, 1951 J. W. ACOSTA 2,563,299

COUPLING AND TONE-CONTROL SYSTEM
FOR AUDIO AMPLIFIERS

Filed Oct. 28, 1947

INVENTOR.
JOSÉ W. ACOSTA,
BY
McMorrow, Berman & Davidson
ATTORNEYS.

Patented Aug. 7, 1951

2,563,299

UNITED STATES PATENT OFFICE 2,563,299

COUPLING AND TONE-CONTROL SYSTEM FOR AUDIO AMPLIFIERS

José W. Acosta, Chicago, Ill.

Application October 28, 1947, Serial No. 782,588

2 Claims. (Cl. 178—44)

This invention relates to audio amplifiers, and more particularly to a coupling arrangement and tone-control system for the audio amplifier of a radio receiver.

A main object of the invention is to provide a novel and improved audio amplifier arrangement embodying tone-control means which is simple to operate, efficient in performance and which is adapted to provide predetermined degrees of tone control.

A further object of the invention is to provide an improved audio amplifier circuit arrangement embodying means for tone control, said arrangement involving fewer parts than have heretofore been required and being very easy to operate to select the tone quality desired at the output end of the amplifier.

Further objects and advantages of the invention will become apparent from the following description and claims, and from the accompanying drawings, wherein:

Figure 5:
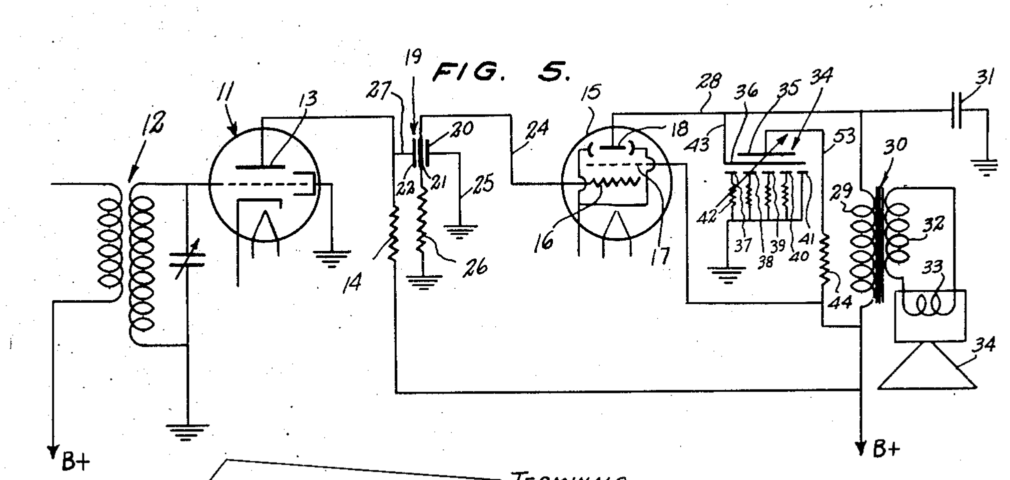
Figure 5 is a circuit diagram of an audio amplified constructed in accordance with the present invention.

Referring to the drawings, and more particularly to Figure 5, 11 designates a conventional detector tube arranged to provide demodulation of a radio signal, the input to the detector tube being derived, for example, from a tuned radio frequency circuit designated generally at 12. The plate, shown at 13, of detector tube 11 is connected through a load resistor 14 to the positive terminal of a plate voltage source in the usual manner.

Figure 6:
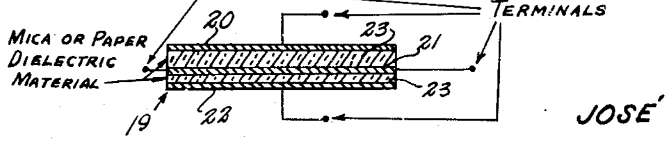
Figure 6 is an enlarged vertical cross-sectional detail view taken through a fixed coupling condenser employed in the audio amplifier diagrammatically illustrated in Figure 5.

Designated at 15 is a conventional amplifier tube, such as a tube of the beam power type, having a control grid 16, a screen grid 17 and a plate 18, as well as the usual cathode, heater and other tube elements. Designated at 19 is a three-plate coupling condenser, shown more specifically in Figure 6, said condenser comprising a first outer plate 20, an inner plate 21 and a second outer plate 22, the inner plate 21 being preferably more closely spaced to the outer plate 22 than to the outer plate 20 and being insulated from both outer plates by suitable dielectric material 23, such as mica or paper. The control grid 16 of tube 15 is connected by a wire 24 to the inner plate 21 of condenser 19. A wire 25 connects the outer plate 20 to ground. Inner plate 21 is connected through a grid leak 26 to ground. The other outer plate 22 of condenser 19 is connected to the plate 13 of detector tube 11 by a wire 27.

The demodulated audio signal voltage appearing across the load resistor 14 is coupled to the control grid 16 of amplifier tube 15 by the relatively large capacity existing between outer plate 22 and inner plate 21 of condenser 19. Lesser capacities respectively exist between plate 20 and the respective plates 21 and 22. These latter capacities are employed to by-pass stray radio frequency currents appearing across load resistor 14 to ground.

Plate 18 of amplifier tube 15 is connected by a wire 28 to one terminal of the primary winding 29 of an output transformer 30, the other terminal of said primary winding being connected to the positive terminal of the plate voltage source. A conventional low-capacity radio frequency by-pass condenser 31 is connected between wire 28 and ground. The secondary winding 32 of output transformer 30 is connected to the voice coil 33 of a reproducer 34 in the usual manner.

Designated at 34 is a variable tone-selecting condenser having a first set of stator plates, indicated schematically at 35 in Figure 5, and a second set of stator plates, indicated schematically at 36. In capacitive relation with both sets of stator plates are sets of rotor plate segments indicated schematically at 37 to 41 in Figure 5. The set of rotor plate segments designated at 41 is connected to ground. The other sets of rotor plate segments are connected to ground through series resistors, such as indicated at 42. The set of stator plates designated at 36 is connected to wire 28 by a wire 43. The set of stator plates designated at 35 is connected through a resistor 44 to the plate voltage terminal of the primary winding 29 of output transformer 30.

Figure 1:
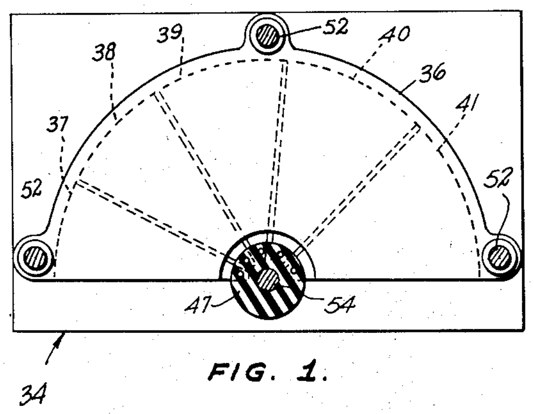
Figure 1 is a transverse cross-sectional view taken through a tone-selecting condenser employed in the audio amplifier of the present invention, said view being taken on line 1—1 of Figure 2.
Figure 2:
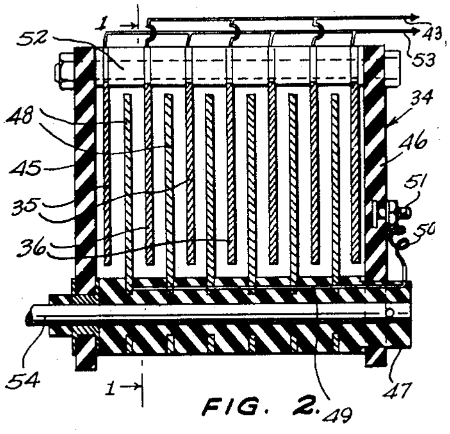
Figure 2 is an enlarged longitudinal vertical cross-sectional view taken through the tone-selecting condenser employed in the audio amplifier of the present invention.
Figure 3:
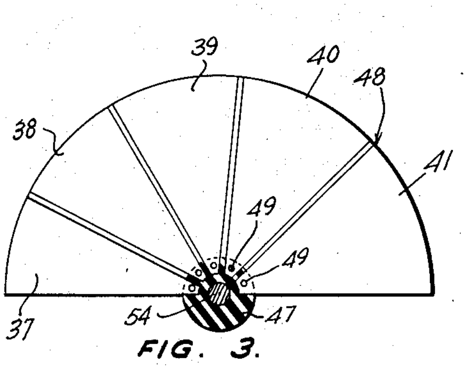
Figure 3 is a transverse cross-sectional detail view taken through the rotor of the tone-selecting condenser of Figures 1 and 2, showing the arrangement of the plate segments of the rotor.

Figures 1 to 3 illustrate in detail the construction of the tone-selecting condenser 34, except that the spaces between the condenser plates has been greatly increased to facilitate illustration. Condenser 34 comprises end-insulating plates 45 and 46 in which is journaled a rotor bushing 47 of insulating material. Secured to the bushing 47 and projecting radially therefrom are uniformly-spaced groups of plate segments indicated generally at 48. Each group of plate segments 48 comprises five coplanar segments 37 to 41. The respective individual segments 37 to 41 of the spaced segment groups 48 are in longitudinal alignment with each other. The respective longitudinally-aligned segments are connected together in bushing 47 by tie conductors, such as shown at 49, embeded in the bushing and terminating in flexible portions 50 connected to respective terminals 51 carried on end plate 46. The connections to the respective resistors 42 and the ground connected of plate segments 41 are made at the respective terminals 51.

Secured to the end plates 45 and 46 are longitudinal post members 52 of insulating material. Secured to post members 52 and extending in intermeshing relation to the rotor plates 48 inwardly toward the rotor bushing 47 are the alternately-arranged stator plates 35 and 36, the stator plates 35 being connected together by a common wire 53 and the stator plates 36 being connected together by the common wire 43. As above described, wire 43 is conected to plate wire 28. Wire 53 is connected through the resistor 44 to the plate voltage terminal of the primary 29.

Figure 4:
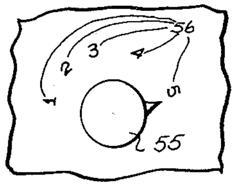
Figure 4 is a fragmentary detail view of a portion of the receiver control panel, showing the tone-selecting knob.

Axially secured in bushing 47 is a control shaft 54 which extends through the control panel of the receiver and has mounted thereon a pointer knob 55. By rotating the knob to the various positions of the pointer thereof, designated at 56 in Figure 4, the condenser rotor may be adjusted to provide incremental capacitive meshing of the segment groups with respect to the stator plates 35 and 36 to provide predetermined graduated increments of capacity between the stator plates 35 and 36, because of the presence of added groups of rotor segments between them, and also to provide predetermined graduated increments of capacity between stator plates 36 and ground. There is thus provided a variable shunt capacitance across the primary of output transformer 30 and at the same time a variable by-pass impedance between plate 18 and ground. Predetermined amounts of the higher audio frequency components of the amplified audio signal may therefore be excluded from the primary of the output transformer 30, and the range of tone selection thus obtained is very wide, due to the fact that the primary is being effectively shunted at the same time that the plate 18 of tube 15 is being by-passed to ground, with respect to said higher audio frequency components.

While condenser 34 has been shown herein as having air dielectric, it may be immersed in suitable liquid having a higher dielectric constant, such as oil or the like, whereby its effective capacitance may be greatly increased.

While a specific arrangement of an audio amplifier and a tone-control system therefor have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an audio amplifier, the combination with a source of voltage, an amplifier stage adapted to amplify audio signals and including a plate, and an output transformer including a primary winding having one terminal connected to said plate and having the other terminal connected to said source of voltage, of a variable tone selecting condenser electrically connected to said primary winding and said plate for excluding predetermined amounts of the higher frequency audio components of said audio signal from said primary winding and for by-passing said plate to ground with respect to said components, said condenser comprising a first set of stator plates electrically connected to said source of voltage, a second set of stator plates electrically connected to said plate, and a set of rotor plates disposed in capacitive relation with respect to said first and second sets of stator plates and electrically connected to a ground for varying the capacity between said first and second sets of stator plates to thereby provide a variable shunt capacity across said primary winding and for varying the capacity between said first set of rotor plates and said ground to thereby provide a variable by-pass impedance between said plate and ground.

2. In an audio amplifier, the combination with a source of voltage, an amplifier stage adapted to amplify audio signals and including a plate, and an output transformer including a primary winding having one terminal connected to said plate and having the other terminal connected to said source of voltage, of a variable tone selecting condenser electrically connected to said primary winding and said plate for excluding predetermined amounts of the higher frequency audio components of said audio signal from said primary winding and for by-passing said plate to ground with respect to said components, said condenser comprising a first set of stator plates electrically connected to said source of voltage, a second set of stator plates electrically connected to said plate, and a set of rotor plates disposed in capacitive relation with respect to said first and second sets of stator plates and electrically connected to a ground for varying the capacity between said first and second sets of stator plates to thereby provide a variable shunt capacity across said primary winding and for varying the capacity between said first set of rotor plates and said ground to thereby provide a variable by-pass impedance between said plate and ground, one plate of said set of rotor plates being directly connected to said ground, and a resistance electrically connected between each of the remaining plates of said set of rotor plates and said ground.

JOSÉ W. ACOSTA.

REFERENCES CITED

The following references are of record in the file of this patent:

UNITED STATES PATENTS

| Number | Name | Date |
|---|---|---|
| 1,591,177 | Minge | July 6, 1926 |
| 1,931,596 | Wheeler II | Oct. 24, 1933 |
| 1,951,685 | Wheeler I | Mar. 20, 1934 |
| 2,181,817 | Miller | Nov. 28, 1939 |
| 2,190,430 | Krambeer | Feb. 13, 1940 |
| 2,233,776 | Foster et al. | Mar. 4, 1941 |
| 2,244,023 | Sauer | June 3, 1941 |